(No Model.)
I. H. SWINK.
CULINARY STEAMER.
No. 282,587. Patented Aug. 7, 1883.
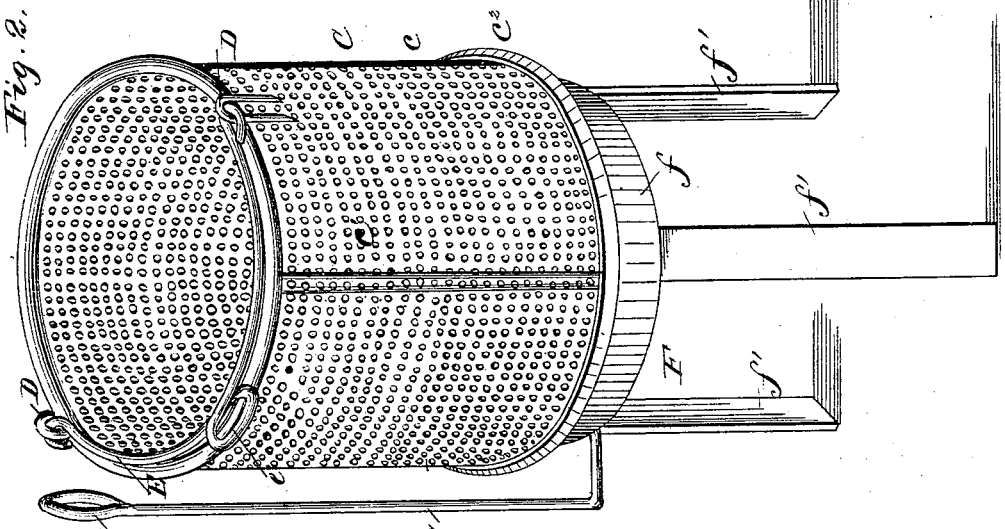
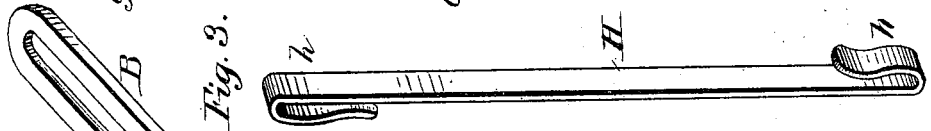
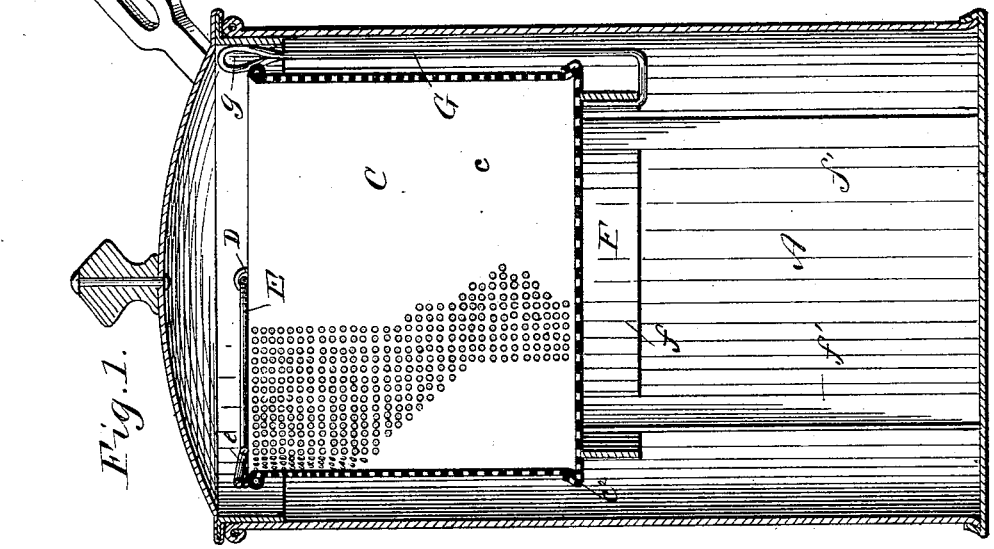
WITNESSES
F. L. Durand
Edw. G. Siggers
INVENTOR
I. H. Swink
by C. A. Snow & Co.
Attorneys

UNITED STATES PATENT OFFICE.

IRVING H. SWINK, OF DUBLIN, PENNSYLVANIA.

CULINARY STEAMER.

SPECIFICATION forming part of Letters Patent No. 282,587, dated August 7, 1883.

Application filed May 26, 1883. (No model.)

*To all whom it may concern:*

Be it known that I, IRVING H. SWINK, a citizen of the United States, residing at Dublin, in the county of Bucks and State of Pennsylvania, have invented a new and useful Cooking-Utensil, of which the following is a specification, reference being had to the accompanying drawings.

This invention relates to culinary or cooking utensils; and it has for its object to provide a device which is susceptible of being used as a colander, flour-sieve, fruit-strainer, egg, potato, or other similar boiler, and a steamer for all articles of food.

It consists in the peculiar combination of parts, as hereinafter set forth, and particularly pointed out in the claim.

In the accompanying drawings, Figure 1 is a sectional view of the cooking-utensil complete, the parts being arranged to serve as a steamer. Fig. 2 is a perspective view of the combined boiler and steamer resting on the stand and removed from the outer vessel. Fig. 3 is a detail view of the device for removing the perforated boiler and steamer.

Referring to the drawings, A designates an outer vessel of any suitable shape and construction, and provided with a handle, B. This vessel can be used for cooking independently of the parts hereinafter mentioned.

C designates a foraminous sheet-metal body, the perforations being formed small, but close together, as shown, so that water will easily enter, yet a ready means of escape will be afforded. The sides $c$ are secured together at $c'$, and the bottom is secured to the sides by soldering or otherwise, a strengthening-wire, $c^2$, being arranged at the junction of the same. The entire body may, however, be made of one piece, if found desirable. On each side of the said body are eyes D, secured thereto and arranged to receive the handle E, said handle being formed with a loop, $e$, at the top, for the purpose hereinafter mentioned.

F designates a stand on which the body C rests, said stand being constructed of a circular frame, $f$, having one or more legs, $f'$, and provided with an extension, G, which extends up parallel with the outer vessel to the top of the same, and having an eye, $g$, which serves as a handle in removing the stand, and also as a means for hanging up the stand when not in use.

H designates a device for removing the body C from the outer vessel, said device consisting, essentially, of a bar having a hook, $h$, at each end extending in opposite directions. Thus the bar can be hung up when not in use; and, as will be seen, by hooking the end $h$ in the loop $e$ of the body C, said body can be readily lifted out, thereby obviating all danger of upsetting or spilling its contents, besides preventing scalding or otherwise injuring the hands.

The operation of my cooking-utensil is obvious, and can be readily understood from the foregoing, taken in connection with the drawings hereto annexed. In said drawings the parts are shown as arranged to be used for steaming articles of food, the water in vessel A being filled up to within a short distance of body C, and the vapor arising from the same serving to "steam" the contents of said body. When it is desired to boil potatoes, eggs, or other articles of food, the body C is filled with the desired article and placed within the outer vessel, A, containing the water, and resting on the bottom of the vessel. While in this position, the contents are boiled until completely done, and the body can then be lifted out by means of the device H; or, if desired, the body can be placed on the stand, so as to keep the cooked contents warm and moist by means of the heated vapor. This manner of warming vegetables is obviously superior to dry heat, as the latter method extracts the moisture.

The body C can be used as a flour-sieve, as the smooth surface of the finely-perforated bottom and sides permits of its ready and convenient use in this connection. It can also be used as a fruit-strainer in extracting the juice from cherries, &c., in making jellies. In practice it is found that the juice readily escapes through the perforations of the body, while the seeds and waste matter will be left within the body and can be removed with very little inconvenience. Indeed, the body C can be used as a substitute for the colander in washing fruit, or other similar work.

After boiling the potatoes, eggs, &c., said articles can be removed without breaking the eggs or destroying the shape of the potatoes, since the water will drain off itself, leaving the solid contents at the bottom.

It is obvious that various modifications can be made in the construction of the foregoing without departing from the spirit or scope of my invention; and it is also obvious that my cooking-utensil can be used for other culinary purposes than those herein enumerated.

My cooking-utensil is simple, durable, inexpensive, and efficient, and admirably serves all the purposes mentioned.

I claim as my invention—

As an improvement in cooking-utensils, the combination of the vessel A with a stand, C, placed within said vessel, said stand being formed of a circular frame, $f$, legs $f'$, and an extension, G, attached to the frame, then bent from the same upward to the top of the vessel, the perforated body C placed on said frame $f$, and having a handle, E, formed with a loop, $e$, a space being left for cooking below the body C, and a device, H, having a hook at each end, adapted to lift the body off the stand or out of the vessel, as desired, substantially as set forth.

In testimony that I claim the foregoing as my own I have hereto affixed my signature in presence of two witnesses.

IRVING H. SWINK.

Witnesses:
 CLINTON H. SWINK,
 EDWARD G. SIGGERS.